United States Patent [19]

Pelgrom

[11] Patent Number: 5,040,283
[45] Date of Patent: Aug. 20, 1991

[54] METHOD FOR PLACING A BODY OF SHAPE MEMORY METAL WITHIN A TUBE

[75] Inventor: Jacob J. Pelgrom, Rijswijk, Netherlands

[73] Assignee: Shell Oil Company, Houston, Tex.

[21] Appl. No.: 387,263

[22] Filed: Jul. 31, 1989

[30] Foreign Application Priority Data

Aug. 31, 1988 [GB] United Kingdom ............... 8820608

[51] Int. Cl.⁵ ............................................ B23P 11/02
[52] U.S. Cl. .................................. 29/447; 29/402.09; 29/402.21; 29/523; 138/97; 138/98; 166/277; 405/150
[58] Field of Search ............... 29/402.09, 447, 402.13, 29/402.16, 402.19, 402.21, 523; 138/98, 97; 166/277; 405/150, 154

[56] References Cited

U.S. PATENT DOCUMENTS

| | | | |
|---|---|---|---|
| 2,214,226 | 9/1940 | English | 138/98 X |
| 3,131,467 | 5/1964 | Thaller et al. | 138/97 X |
| 3,354,955 | 11/1967 | Berry | 138/98 X |
| 3,358,760 | 12/1967 | Blagg | 166/277 |
| 3,900,939 | 8/1975 | Greacen | 29/447 X |
| 4,355,664 | 10/1982 | Cook et al. | 138/98 X |
| 4,379,575 | 4/1983 | Martin | 285/369 |
| 4,394,202 | 7/1983 | Thomas et al. | 29/402.09 X |
| 4,501,124 | 2/1985 | Shone et al. | 62/129 |
| 4,581,801 | 4/1986 | Kobuck et al. | 29/402.09 X |

FOREIGN PATENT DOCUMENTS

3544128A1 6/1987 Fed. Rep. of Germany .
28758 3/1977 Japan ............................. 29/402.09

OTHER PUBLICATIONS

"Geheugenmetaal: eigenschappen en toepassingen", De Constructeur, Aug. 1987, P. A. Besselink, (No English translation available).

*Primary Examiner*—Joseph M. Gorski

[57] ABSTRACT

A body of shape memory metal is placed within a tubing by a running sub which transports the body to a desired location within the tubing while the shape memory metal is in its martensitic phase whereupon the shape memory metal is heated so as to regain its original shape which is tailored to its application inside the tubing.

12 Claims, 1 Drawing Sheet

METHOD FOR PLACING A BODY OF SHAPE MEMORY METAL WITHIN A TUBE

BACKGROUND OF THE INVENTION

The invention relates to a method for placing a body of shape memory metal within a tubing.

It is known from German patent specification 3,544,128 to provide a pipe connection by means of a sleeve of a shape memory metal which is stretched before installation while it is kept at a low temperature and which is subsequently heated so as to raise its temperature to above the austenitic/martensitic temperature transition range thereby causing the sleeve to shrink around the pipeline ends which are to be interconnected.

In many situations, however, the pipe exterior may be inaccessible, for example if the pipe forms part of a subsurface tubular string used for the production of hydrocarbons from a well. Then there is a need to transport a body of shape memory metal, which may be needed for tubular string repair such as necessitated for corrosion repair, sand exclusion or other operations, through the tubular string and then place it at any desired location in said string.

SUMMARY OF THE INVENTION

Accordingly, it is an object of the present invention to provide a method for placing a body of shape memory metal in a tubing.

The method according to the invention comprises bringing the body of memory metal into a desired shape which is tailored to the use of the body within the tubing while the shape memory metal is at a temperature above the austenitic/martensitic transition temperature range, cooling the body of shape memory metal to a temperature below the transition range, deforming the body of shape memory meal to a shape which allows free movement of the body through the tubing and attaching the body to a running sub, moving the running sub with the body of shape memory metal attached thereto through the tubing while maintaining the shape memory metal at a temperature below the transition temperature range, maneuvering the sub to a location in the tubing where the body of shape memory metal is to be placed, heating the shape memory metal to above the transition temperature range and allowing the shape memory metal to deform to the desired shape, and retrieving the running sub from the tubing.

It is to be understood that in this specification and in the claims, the term "tubing" refers to any possible tubular system or body, such as an elongate pipe string for transfer of fluids or a cased or uncased borehole that has been drilled into subsurface formations for the production of hydrocarbons.

Preferably the method according to the invention comprises the steps of preshaping a construction incorporating shape memory metal, while its temperature is above the transition range, to such a special shape that after installation the construction tends to expand against the inner wall of the tubing, scrolling the construction around a section of a running sub while its temperature is held below the transition range, heating the construction to above the transition temperature range so as to induce the construction to expand against the inner wall of the tubing at the desired position, and detaching the running sub from the expanded construction of shape memory metal.

In a preferred embodiment of the invention the construction incorporating shape memory metal consists of a sheet of shape memory metal which is brought into a folded C-shape or into a corrugated shape around the running sub in order to create sufficient clearance between the construction and the tubing wall during its transport to the locations inside the tubing where it is to be installed.

BRIEF DESCRIPTION OF THE DRAWINGS

The invention will now be explained in more detail with reference to the accompanying drawings, in which.

DETAILED DESCRIPTION OF THE PREFERRED EMBODIMENT

Figure 1:
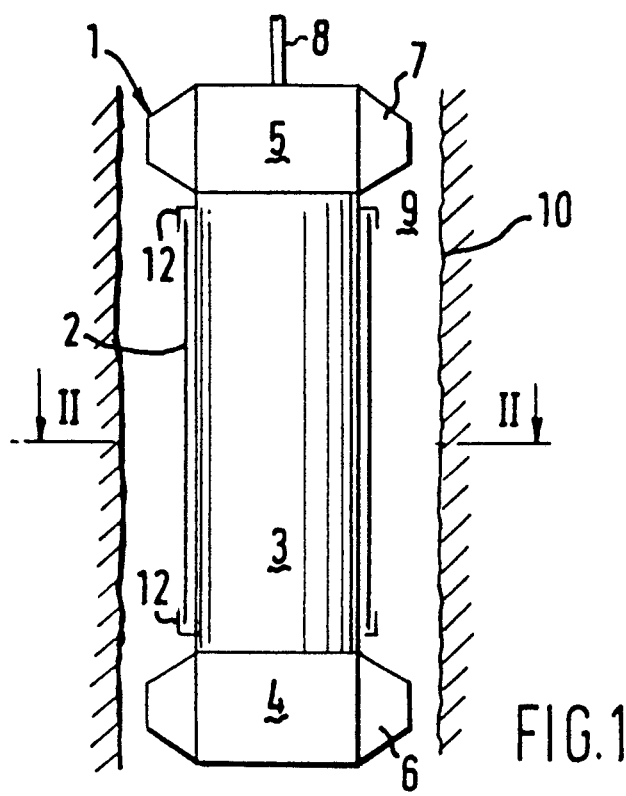
FIG. 1 shows a running sub carrying a construction of shape metal inside a tubing.

Referring now to FIG. 1, there is shown a running sub or mounting sub 1 which carries a scrolled body or construction 2 of shape memory metal.

The running sub 1 comprises a cylindrical mid section 3 and two end sections 4 and 5 around which protecting stabilizers 6 and 7 are secured. The running sub 1 is suspended from a wireline 8 inside a tubing such as a borehole or tubular string 10. Alternatively, the running sub may be carried by or form part of a pipe string such as a string of drill pipes or small size continuous tubing.

The stabilizers 6 and 7 protect the construction of shape memory metal from contact with the borehole wall or tubular string 10 during the descent of the sub to the location where the construction 2 is to be installed. During the desecent, the construction 2 is scrolled around the cylindrical mid section 3 of the mounting sub 1 and possibly held in place by clamps 12 which are also made of shape memory metal.

The procedure for securing the construction 2 of shape memory metal around the running sub 1 before lowering the sub into the borehole 9 and the procedure for detaching the construction 2 from the sub 1 when the sub 1 has arrived at the location where the construction 2 is to be placed is as follows.

At the surface the construction 2 of shape memory metal is brought into an expanded shape which corresponds roughly to the contour of the borehole section or tubular string where the construction is to be placed. This may be accomplished by scrolling a rectangular sheet of shape memory metal around a cylindrical element which has a diameter corresponding to the internal width of the borehole or tubular string. The construction 2 is held at a temperature above the austenitic/martensitic transition range during the above step of preshaping the shape memory metal. This transition range can be influenced by varying the composition of the shape memory metal. The transition range will generally be set somewhere between about 50° C. and 100° C. for applications in a hydrocarbon production well, depending upon the actual location of placement and utilization of the construction of shape memory metal in the well.

After the above step of preshaping, the construction 2 is cooled to below said austenitic/martensitic transition range.

Figure 2:
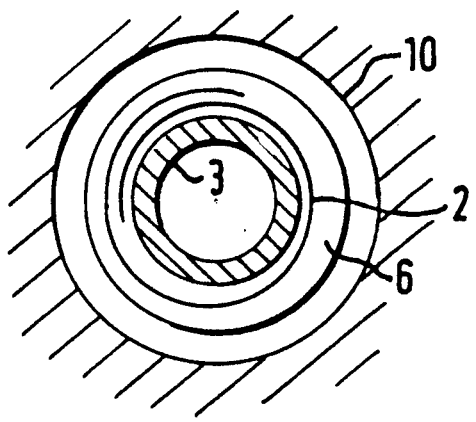
FIG. 2 shows the sub of FIG. 1 when seen in cross-section along line II—II.

Now the shape memory metal is in the martensitic phase and can easily be deformed and scrolled around the cylindrical section 3 of the running sub 1 in the manner as shown in FIG. 2.

In the same manner, when necessary, the clamps 12 are preshaped such that they allow release of the construction whilst the clamps 12 are deformed after cooling them down to below the austenitic/martensitic transition range into the shape shown in FIG. 1 in which they are clamped around the construction 2.

Subsequently the running sub 1 is lowered into the borehole 9 while its temperature is maintained below the austenitic/martensitic transition range. When the running sub 1 is positioned at the location where the construction 2 is to be placed, the mounting sub is heated, e.g., by a directly or indirectly electrically driven heater or a microwave source (not shown) to above the austenitic/martensitic transition range of the memory metal. This causes the clamps 12 to be released from the construction 2 and the construction 2 to unfold to its expanded shape against the borehole wall or tubular string 10. Sealing of the expanded construction 2 against the borehole wall 10 can be accomplished by means of a flexible elastic or soft metal layer (not shown) which is bonded to the borehole wall 10 at the ends of the construction 2. Alternatively or additionally, some form of bonding agent may be applied to the outer surface of the construction 2 which agent only gets its gluing properties after a prolonged contact with mud or a specially circulated fluid. The bonding agent may also be of the type which gets its bonding properties when subjected to a high temperature or of a two-component type which becomes active when the second component is freed by, e.g., the hydrostatic pressure of the borehole fluid. Instead, the bonding agent may be of a soft metal type through which metal-to-metal sealing characteristics can be derived from a predetermined constrained expansion of the shape memory metal construction.

The construction of shape memory metal may be placed across a zone of the borehole 9 where the borehole wall 10 is fractured and where loss of drilling fluid into the formation takes place or formation water flows in the borehole. During drilling through such fractured formations the running sub 1 may be included in a drill string and if drilling fluid losses occur the construction is positioned across the loss zone and secured to the borehole wall by lowering a heating tool (not shown) through the drill string to heat the sub 1 to the temperature at which the shape memory metal becomes in its austenic phase. The strength of the bonding agent should be sufficient to temporarily withstand the pressure difference between the formation fluids and borehole fluids until the borehole is cased-off. Furthermore, it should also be able to withstand impacts from drill string stabilizers while drilling or tripping, while allowing the drill string downhole tools to be retracted from the borehole through the expanded construction.

Besides the above described utilization of a construction of shape memory metal as a patch-while-drilling (PWD) tool there are numerous other applications where placement of a construction of shape memory metal inside a tubular string may be needed, such as downhole repair of a corroded oil or gas production tubing, downhole shut-off of watered out or sand producing zones while maintaining access to deeper producing zones of an oil or gas reservoir, repair of environmentally inaccessible flow-or bulk oil or gas transfer lines, placement of a through-tubing bridge plug in a well, repair of a failed latch in a dual string well completion, repair inside inaccessible surface equipment such as replacement of a heating coil inside a reactor vessel of a gas plant.

Figure 3:
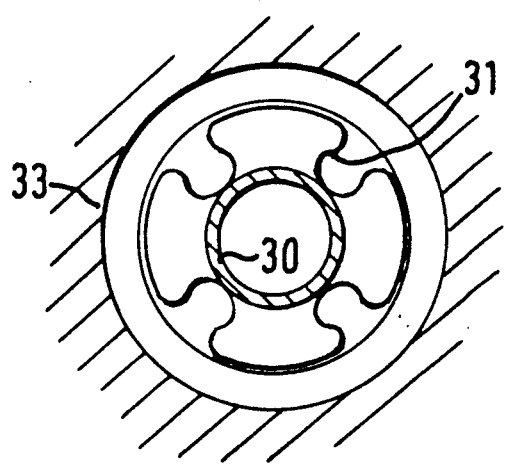
FIG. 3 shows in cross-section a running sub carrying an alternative construction of shape memory metal.

It will be understood that instead of scrolling the shape memory metal around a cylindrical section of the running sub 1 it may be secured thereto in any other suitable manner. FIG. 3 shows an embodiment where a running sub 30 carries an originally cylindrical body 31 of shape memory metal, which body is in the martenitic phase while it is brought into a concave convex corrugated shape around the sub 30. When the running sub 30 has reached the location where the body 31 of shape memory metal is to be placed, it is heated so as to induce the body of shape memory metal to regain its originally cylindrical shape which is tailored to the internal width of the borehole 33.

Instead of the particular shape shown in the drawing, the body of shape memory metal may have any other suitable shape, depending upon the type of operations in which it is utilized. The memory metal may for example be lowered through a well at the lower end of a running sub for use as a fishing tool to retrieve lost equipment from a well. In that case the body of shape memory metal is maneuvered around or, if possible within or over the top of, the lost equipment and subsequently heated so as to deform and firmly grip the equipment, whereupon the running sub together with the equipment is retrieved from the well.

The running sub may be provided with cooling and-/or heating means. The cooling means may be activated to maintain the shape memory metal in the martensitic phase while the sub is moved through a tubular string whereas the heating means are activated when the sub has reached the location where the body of shape memory metal is to be placed in order to bring the shape memory metal in the austenitic phase.

If the running sub is moved from an environment where the temperature is below the austenic/martensitic transition range of the shape memory metal into a tubing where the temperature is just above said range the heat inertia of the mounting sub may be utilized to maintain the shape memory metal in the martensitic phase during transport and to allow its transition into the austenitic phase after having reached the location where it is to be placed.

From the above description it will become apparent to those skilled in the art that apart from the embodiments shown in the drawings there are numerous possible modifications of the procedure for placing a body of shape memory metal inside a tubular string. Accordingly, it should be understood that the embodiments of the present invention shown in the drawings are illustrative only.

What is claimed is:

1. A method for placing a body of shape memory metal within a tubing of a subterranean well, the method comprising the steps of:

preshaping the body of shape memory metal while it is at a temperature above its austenitic/martensitic transition range into a special shaped construction tailored for use in the tubing such that, after installation, the construction tends to expand against an inner wall of the tubing;

attaching the body to a running sub between a plurality of protecting stabilizer blades;

deforming the special shaped construction into a shape which allows free movement of the special shaped construction through said tubing, said deforming including scrolling the constriction around a cylindrical section of the running sub while holding the temperature of the construction below said transition range;

moving the running sub with the body of shape memory metal attached thereto through said tubing while maintaining the construction at a temperature below said transition range;

maneuvering the running sub to a location in said tubing where the construction is to be placed;

heating the construction to above said transition range, thereby causing the construction to deform, expand and seal against the inner wall of the tubing and thereby secure a flow path therethrough;

detaching the running sub from the expanded construction; and retrieving the running sub from the tubing.

2. The method of claim 1, further comprising mounting the protecting stabilizer blades above and below said cylindrical section and fixing the construction in its scrolled shape with a pair of clamps during the moving of the sub through the tubing and wherein the step of detaching the running sub from the construction comprises removing the clamps from the construction when the running sub has reached the location where the construction is to be placed.

3. The method of claim 1, wherein maintaining the construction of shape memory metal at a temperature below said transition range comprises cooling the shape memory metal with a cooling means provided in the running sub until the sub has reached the location where the construction is to be placed.

4. The method of claim 1, wherein heating the construction to above said transition range comprises heating the construction with a heating means in the running sub after the sub has reached the location where the construction is to be placed.

5. The method of claim 1, further comprising securing the construction to the inner wall of the tubing by activating a bonding agent carried by the construction, after expanding the construction against the inner wall of the tubing.

6. The method od claim 1, wherein the step of preshaping the body of shape memory metal consists of scrolling a sheet of shape memory metal around a cylindrical element which has a diameter which is similar to the internal width of the tubing in which the construction is to be placed.

7. A method for placing a body of shape memory metal within a tubing of a subterranean hydrocarbon production well, the method comprising the steps of:

preshaping a body of shape memory metal into a construction of a desired special shape while the shape memory metal is at a temperature above its austenitic/martensitic transition range, said special shape being tailored to use the construction within said tubing such that the construction tends to expand against an inner wall of the tubing after installation;

cooling the construction to a temperature below said transition range;

deforming the construction to a shape which allows free movement of the construction through the tubing, comprising:

attaching the construction to a mid-section of a running sub having a plurality of stabilizers mounted above and below the mid-section; and scrolling the construction around a cylindrical section of the mid-section of the running sub while holding the temperature of the construction below the transition range, thereby allowing free movement of the construction through the tubing;

moving the running sub with the construction attached thereto through said tubing while maintaining the construction at a temperature below said transition range;

maneuvering the running sub to a location in said tubing where the construction is to be placed;

heating the construction to above said transition range, thereby causing the construction to deform to said desired special shape by expanding against the inner wall of the tubing;

detaching the running sub from the expanded construction; and retrieving the running sub from the tubing.

8. The method of claim 7, wherein scrolling the construction around the cylindrical section comprises fixing the construction in its scrolled shape with a pair of clamps during the moving of the running sub through the tubing and wherein the step of detaching the running sub from the construction comprises removing the clamps from the construction when the running sub has reached the location where the construction is to be placed.

9. The method of claim 7, wherein the step of cooling the construction to a temperature below said transition range comprises placing a cooling means in the running sub until the running sub has reached the location where the construction is to be placed.

10. The method of claim 7, wherein the step of heating the construction to a temperature above said transition range comprises placing a means for heating the construction into the running sub after the running sub has reached the location where the construction is to be placed.

11. The method of claim 7, further comprising, securing the construction to said inner wall by activating a bonding agent carried by the construction after the step of heating the construction has caused the construction to expand against the inner wall of the tubing.

12. The method of claim 7, wherein the step of preshaping the body of shape memory metal comprises scrolling a sheet of shape memory metal around a cylindrical element which has a diameter which is similar to the internal width of the tubing in which the construction is to be placed.

* * * * *